March 27, 1945.   E. LABIN   2,372,328
ELECTRIC DEVICE
Filed Feb. 3, 1943   5 Sheets-Sheet 1

EDOUARD LABIN
INVENTOR.

BY

ATTORNEY

March 27, 1945.　　　　E. LABIN　　　　2,372,328
ELECTRIC DEVICE
Filed Feb. 3, 1943　　　　5 Sheets-Sheet 2

EDOUARD LABIN
INVENTOR.

BY
ATTORNEY

March 27, 1945.  E. LABIN  2,372,328

ELECTRIC DEVICE

Filed Feb. 3, 1943  5 Sheets-Sheet 3

EDOUARD LABIN
INVENTOR.

BY
ATTORNEY

March 27, 1945.   E. LABIN   2,372,328
ELECTRIC DEVICE
Filed Feb. 3, 1943   5 Sheets-Sheet 4

EDOUARD LABIN
INVENTOR.

BY
ATTORNEY.

March 27, 1945.     E. LABIN     2,372,328

ELECTRIC DEVICE

Filed Feb. 3, 1943     5 Sheets-Sheet 5

EDOUARD LABIN
INVENTOR.

BY

ATTORNEY.

UNITED STATES PATENT OFFICE 2,372,328

ELECTRONIC DEVICE

Edouard Labin, Buenos Aires, Argentina, assignor to Hartford National Bank and Trust Company, Hartford, Conn., as trustee Application February 3, 1943, Serial No. 474,591

12 Claims. (Cl. 315—30)

The present invention relates to electronic devices of the kind in which an electronic beam is used for transporting a useful electrical quantity from a generating side to an output side of the device, and means are provided for modifying the conditions of transportation in accordance with some preselected factor.

The invention has in view the provision of a novel device of the general kind described, by means of which certain desirable results hitherto attainable only with considerable difficulty, if at all, may readily and efficiently be achieved, and which is also applicable in a large number of diverse ways in a variety of different fields.

One of the problems which is daily acquiring increased importance in the technique of telecommunications, is the control of the phase of electrical oscillations. It is highly desirable that this control should be very flexible, and this involves chiefly the ability to shift the phase of large angles of up to thousands of radians, the ability to control the phase shift immediately, and the ability of performing the operation without prohibitive errors or difficulties up to high frequencies.

These conditions cannot, for obvious reasons, be met by the phase displacement devices hitherto known, which are based on capacity, inductance and resistance circuits, in which the only means of controlling the phase displacement is by mechanically varying a material element. The phase displacements so producible are merely special phenomena relative only to the cases of purely sinusoidal signals. The only magnitude having an autonomous meaning is a retardation, a difference of time. But capacities or self-inductances do not retard anything, they only delay the signal during the so-called transition process during such time as is required for the signal to become established at its full value. When the signal is periodic and maintained, the resulting signal becomes established at the end of the transition period in such wise as to maintain thereafter a fixed displacement with respect to the applied signal. Variation of the material element to vary the displacement, disturbs the circuit, unless other elements are simultaneously varied, and the number of these increases with increasing exacting requirements. Such permanently obtaining displacement cannot be considered a retardation properly so called, and is, besides, fundamentally independent of time and is not defined except with regard to the period of the signal. For each simple phase shifting element which is purely reactive, its value is exactly $$\pm \frac{\pi}{2}$$

and corresponds to a differentiation or integration with respect to time. This shows that the only means of obtaining large phase displacements along these lines is to multiply the number of differentiations or integrations through which one must pass from the applied to the resultant signal. Moreover, such known circuits will always generate only the equivalent of a retardation, valid only for sinusoidal operation namely the transmission delay $$\frac{d\phi}{d\omega}$$

$\omega$ being the frequency of the applied signal.

Although phase displacement by circuits is equivalent to a retardation only in very special circumstances, a true retardation is always equivalent to a phase displacement whenever the displacement is defined, that is, whenever the waves are sinusoidal. Then the phase shift $\phi$ equivalent to a retardation $t$ is $\phi=\omega t$, where $\omega$ is $2\pi$ times the frequency of the sinusoidal wave. Hence the solution of the above-stated problem is to be found in the provision of means for obtaining a true retardation, and the present invention is primarily concerned with the provision of such means. A retardation impressed on waves has, however, a meaning in itself, whatever may be the nature of the waves, and may therefore find other applications. Such other applications, arising directly from the nature of the novel electronic device, are also contemplated by the present invention.

The retardation effect obtained with known phase shifting circuits is, in general, completely negligible, because the speed of propagation of the electrical effects in the organs concerned is still $3\times10^{10}$ cm./sec. If, however, a beam of electrons be used in vacuo for transmitting the said effects, the speed of propagation identifies itself with that of the displacement of the electrons and is much lower than $3\times10^{10}$ cm./sec. Ideally, therefore, the problem could be solved by utilizing a hexapole device in which an electron beam is caused to propagate itself from an input end where a pair of input terminals would be provided, to an output end, where a pair of output terminals would be located, and which includes a pair of control terminals whereby the effective speed of propagation of the beam could be controlled in response to some applied electrical quantity.

Some devices have already been proposed in which the above-indicated lines have been followed more or less consciously, but, in general, these known devices have involved tubes in which the control was effected only along a short segment of trajectory in the same sense as the principal acceleration of the electrons, and the retardation thus achieved is still too small for many applications.

It has likewise been proposed, exclusively in connection with a problem of frequency modulation, to provide a tube in which the variation of the time of propagation is obtained by placing an anode as an inclined target, so that the electrons have to cover a longer or shorter path before striking the target, in response to deviations impressed on the beam by a controlling quantity. This construction suffers from the disadvantage that it can use only concentrated beams the speed of which is still rather high, and that the effect is obtained by varying the point of incidence of the beam. Thus the value of the retardation obtainable is restricted. Moreover, in all the known prior attempts, the spontaneous variation of the initial velocity appears, as a whole, as a parasitic modulation of the desired retardation.

In the novel device of the present invention the retarding effect is obtained along the trajectory itself, on the one hand by utilizing lower speeds of propagation, and on the other hand, and in order to overcome the difficulty due to the preparation of electron beams at very low potentials, by arranging the conditions so that, in spite of a total velocity for the electrons which is still comparatively high, the passage between the entrance and the exit is made at an effective velocity which shall be only a component of the main velocity and may be tens or even hundreds of times smaller. If the electrons were permitted to travel undisturbed with their main velocity, immediate prohibitive displacements would be obtained. It is therefore a feature of the present invention to compel the electrons, with the aid of a suitable arrangement of electric or magnetic "director" fields, to remain within a convenient limited space by causing them to follow a circular, spiral or helicoidal trajectory. Another advantage of the novel device is to be found in the fact that the director fields will act as concentration means to prevent the spontaneous dispersion of the electron beams propagated in an equipotential space such as the paths used in the prior attempts.

In my prior U. S. patent application Ser. No. 436,374 filed March 26, 1942, on "Method of generating frequency modulated waves," I have given a summary description of a tube designed in accordance with the novel principles indicated hereinabove, to give the required large values of phase displacement by impressing a retardation of the signal carrying beam. However, only the barest structural elements, which are seen to be requisite from the broad theory of the tube, were indicated in my said prior application.

The present invention has for its principal object the provision of a novel electronic device whereby a retardation or phase displacement may be impressed on a signal between an input point and an output point in an accurate and practically operable manner.

Another object of the present invention is to provide a novel electronic device of the type described, which shall be capable of creating a constant retardation the amount of which may be selected within very wide limits.

A further object of the present invention is to provide a novel electronic device of the kind described, which shall be capable of creating a retardation variable during operation, the variation constituting the principal useful effect.

These and other objects and advantages of the present invention will become apparent from description of certain preferred embodiments thereof illustrated in the accompanying drawings, in which.

The basic idea on which the present invention is grounded, is that mentioned in my said prior application, namely that an electron beam which penetrates into a zone where a magnetic field obtains, and which has an initial velocity perpendicular to the field, travels round in a circle in a plane perpendicular to the field at a pulsation depending only on the field. In said prior application mention was made of the separation of the points of entry and exit of the beam in the zone subjected to the field, but the utilization of only a semi-revolution, in other words, the first arc of the cyclical trajectory impressed on the beam envisaged.

The present invention provides a retardation tube of a much more generalised nature, which while including the primitive type mentioned in said prior application, embraces also embodiments in which the electron beam is caused to follow spiral or helical trajectories of a plurality of convolutions or turns, and likewise extends to tubes providing helico-spiral trajectories.

Figures 1, 3:
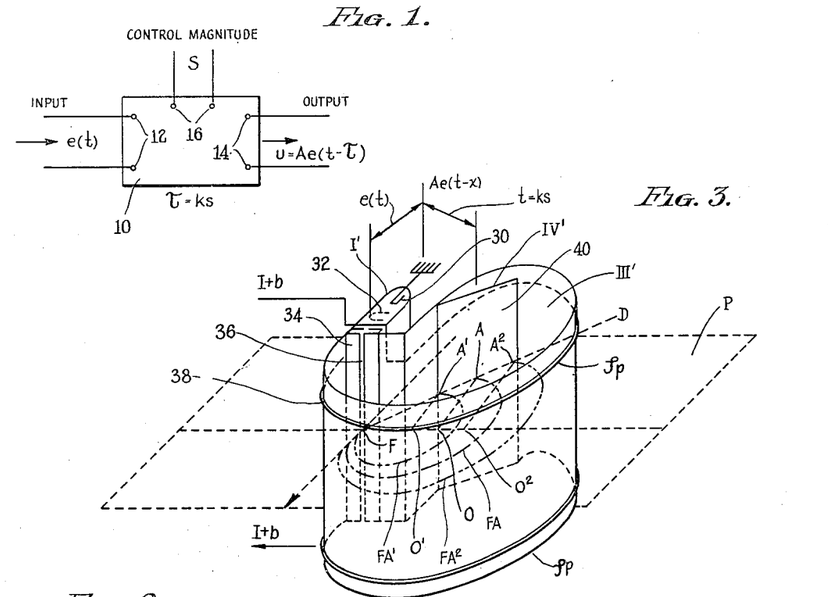
Fig. 1 is a block diagram of an idealised hexapole retardation device.
Fig. 3 is a diagrammatic perspective view illustrating one form of said retardation device.

In Fig. 1 is shown diagrammatically a hexapole device represented by the rectangle 10 and having input terminals 12 on which the signal to be retarded, $e(t)$ is impressed. At output terminals 14 the retarded signal $u = Ae(t-\tau)$ is taken off, said retarded signal being produced by the application of some suitable control magnitude, $s$, to control terminals 16. In the above expression for $u$, the symbol $\tau$ represents the time which elapses when the beam moves along its trajectory from the point of entry to the point of exit from the controlling zone, such time therefore constituting the desired retardation. In the following discussion a bar over a letter representing a time or a frequency or a pulsation will mean that the quantity represented is expressed respectively in microseconds or megacycles or megahertz. Also, instead of the retardation $\tau$ created by the device, the product thereof by $2\pi$ will be used and written $\theta$, so that $\theta=2\pi\tau$. This convention simplifies interpretations and calculations when the retarded wave is sinusoidal and of frequency $\bar{f}=\omega/2\pi$. In this case, which is the most usual for radio technicians, the retardation $\theta$ corresponds to the phase displacement (in radians). The retardation suffered by any signal whatsoever will be $\theta/2\pi\mu$ secs., and if the signal is sinusoidal of frequency $\bar{f}$ mc./sec., the phase shift suffered will be $\theta\bar{f}$ radians.

Figure 2:
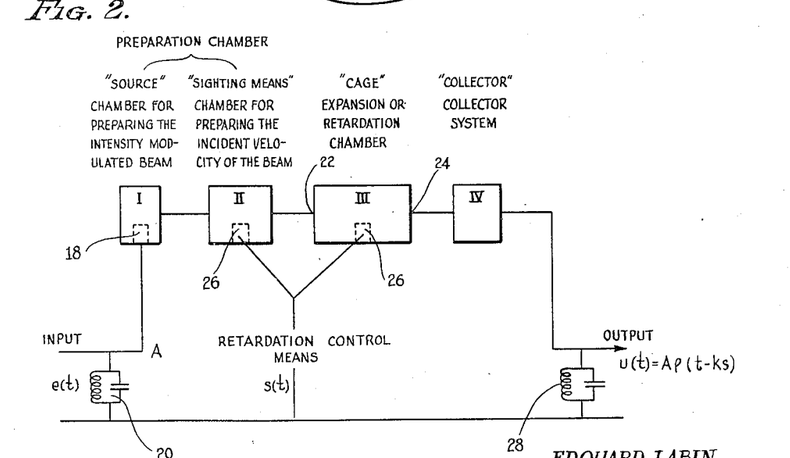
Fig. 2 is a block diagram illustrating the general make-up of my novel electronic retardation device.

The principal constituent zones of the novel device of the present invention are shown diagrammatically in Fig. 2, which may be considered as an exploded and enlarged view of the ideal hexapole of Fig. 1. In Fig. 2 four separate sections I, II, III, and IV are shown, but obviously these may be intermingled to a greater or less extent in practical embodiments as will hereinafter appear. In section I, which will be briefly termed the "source," the electron beam modulated in intensity is prepared. Such a beam may be provided by any known means and modulated in intensity by the tension of a control member 18, generally an ordinary grid. For purposes of illustration an input circuit 20 has been shown which impresses an incident signal $e(t)$ on the member 18. Thus the electron beam will carry a current the intensity of which has been modulated proportionately to the signal $e(t)$ around a mean value.

Since the device is to operate by utilization of an effective velocity, the velocity with which the electron beam modulated in intensity enters the zone in which the retardation is impressed on it, must be carefully adjusted so that, as will hereinafter appear, the velocity vector may make the required angle with the (imaginary) mean circular path in said zone. In other words the beam will have to be sighted along some tangent to such circular path. Hence, the next section II of the device comprises means for preparing the incident velocity of the electron beam with respect to the retardation zone, and section II will, therefore, for brevity be denominated "sighting" section, zone or chamber. Section III of the device is the retardation zone or "cage," which is the main operative stage where the beam is caused to move along a trajectory such that the time $\tau$ which elapses between the entry of the beam at the point of entrance 22 to the cage and emergence thereof at the point of exit 24 constitutes the desired retardation. As indicated hereinabove, the space within the cage is, for the purposes of securing the retardation, subjected to electric and/or magnetic fields, hereinafter denominated "director fields," and the cage also acts, as previously stated, as an electronic lens.

A member 26 is provided for controlling the retardation and such member may act on the incident velocity vector as prepared by the sighting means, or on the development of the trajectory within the cage, or on both of these factors. The section designated by the reference character IV in Fig. 2 is a collector system, which has been shown as a special section because, as will hereinafter appear, it is, in general necessary to give it certain refinements in order to uncouple the cage from the exit 24, where the electronic current returning through an output circuit 28 would develop a tension capable of disturbing the adjustment of the director fields.

The simplest form of my novel retarding device is diagrammatically represented in Fig. 3 and is based on the following considerations.

It is known that an electron which moves in a magnetic field H uniform in magnitude and direction, with an initial velocity of V cm./s. perpendicular to H, describes a circle of radius $R=V/\Omega$ or more conveniently expressed, of diameter $D=2V/\Omega$, with a constant angular velocity in sec.$^{-1}$ $\Omega=22.2\times10^6\times H$ amp./cm. It can be shown that the retardation $\theta$ is given by $$\theta=1.78/H$$

and that $$D=\frac{5.36\sqrt{U}}{H}=3\theta\sqrt{U}$$

where U is the accelerating tension. Tensions are in volt, lengths in cm., magnetic fields in amp./cm.

The device of Fig. 3, comprises a source I' of a beam of electrons said source including a cathode 30, grid 32 and plate 34, the latter having an elongated slot 36 acting as the sighting means. An accelerating tension U is supposed applied to the plate 34 which measures the velocity V of the electrons, supposed constant in magnitude and direction. The grid 32 controls the intensity of the current carried by the beam, which emerges through the slot 36 into a retarding chamber III' surrounded by a magnetizing winding 38 designed to generate in the chamber III' a magnetic field H perpendicular to the direction of propagation of the beam. For different values of H the electrons will describe circular trajectories of differing diameters and the traces of three such trajectories on the mean plane P perpendicular to the field H are shown in chain lines at $\overline{FA}$, $\overline{FA_1}$, and $\overline{FA_2}$ in the figure. In the embodiment shown in Fig. 3, the field H does not reign in the source I' so as not to modify the propagation of the beam from the cathode 30 to the slot 36.

Figure 4:
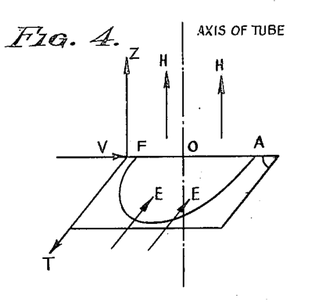
Figs. 4 and 5 are graphical representations of paths of the electron beam.

It is also possible to admit into the cage, electrons having an incident velocity directed towards the centre of the cage, as illustrated by the diagram of Fig. 4 in which an electrical field $E=\mu_0 vH$ is used, $\mu_0=4\pi\times10^9$ being the permeability of the vacuum in practical units, and E being expressed in volts/cm., $v$ in cm./sec. and H in amp./cm.

Under these conditions the electrons behave as if they moved with the same speed V but in a direction FT perpendicular to FA. If the relationship between E and H is not exactly that set forth above, the trajectory obtained will be a cycloid instead of a circle but the retardation will still be $\theta=1.78/H$.

It is likewise possible to maintain the trajectory fixed by modulating the speed, that is to say the tension U, at the same time as the field H. In order that the radius of the trajectory may remain fixed, it is sufficient that $dU/U=2\ dH/H$, and this relationship can readily be adjusted if the variable parts $dU$ and $dH$ be taken from the voltage and current of two tubes energized by the same control magnitude and regulated as to amplitude.

Reverting to the device modulated only by the field H as shown in Fig. 3, it is necessary, if the retardation is always to remain the same function of the field, that the section of the trajectory included between the extreme points is always the same fraction of a revolution. This condition is readily satisfied by distributing the extreme points $A_1$, A, $A_2$ along a straight line FD passing through the origin F of the motion, since in these circumstances the angles at the centre $F\hat{O}_1A_1$, $F\hat{O}A$ and $F\hat{O}_2A_2$ are all equal and the corresponding triangles are all isosceles. Hence the collector IV' is shown as a plate 40 located in a plane parallel to the slot 36 and comprising the line FD. The position of the plate 40 shown in the figure corresponds to a utilization of ¾ of a revolution.

In applying in practice a device designed along the lines of Fig. 3, it is found that under certain conditions of operation very low values of the working tension, lying between 200 and 1 millivolts must be used in order to secure retardation of 1 to 200 radians/mc. Hence speed filters must be included in the device for these particular applications and special precautions must also be taken to control the contact voltages, the temperatures of the circuits and also the parasitic charges which, by accumulating on the walls, might create parasitic accelerating tensions of the order of millivolts. Moreover, the controlling power of a grid on an electron beam of such low velocities is itself weak and this leads to weakness of the useful signal.

These difficulties can be satisfactorily overcome, while still adhering to the same general underlying principle for obtaining the retardation, by causing the electron beam to make a plurality of revolutions in the cage before striking the collector member. To enable the electrons to be collected under these conditions, they must be at a distinct and defined place, and this entails the modification of the purely circular character of the path.

Two ways of meeting this requirement at once present themselves, namely, the utilization of a spiral trajectory of a varying plurality of convolutions, and the adoption of a helical path of a plurality of turns. The first of these alternatives will now be considered with particular reference to Fig. 5.

Figures 5, 7, 8:
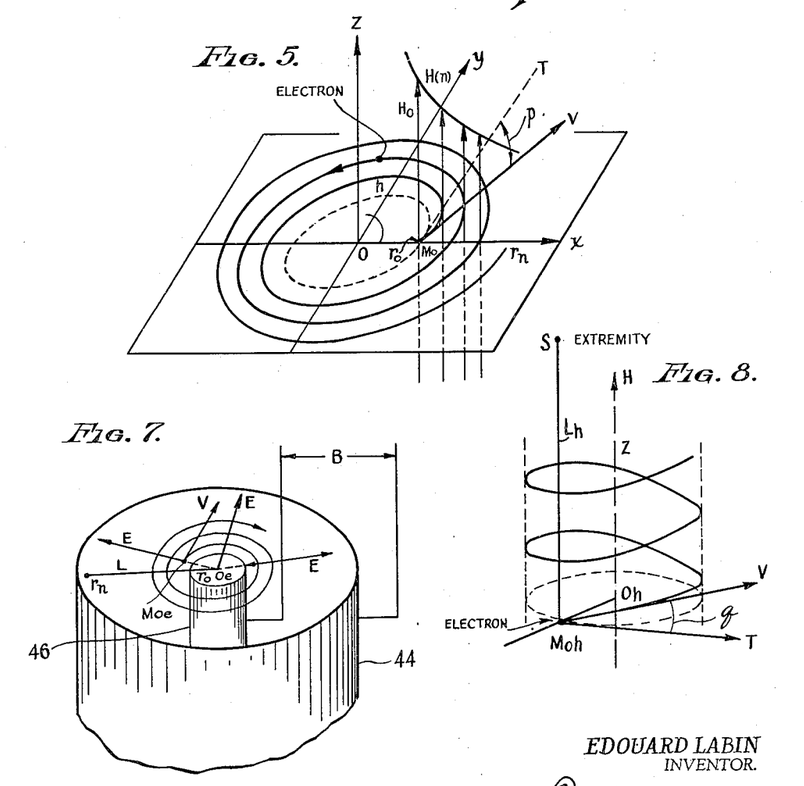
Fig. 7 is a diagrammatic perspective view of certain parts of a retardation device in which the electron beam follows a spiral trajectory.
Figs. 8, 9 and 10 are graphical representations illustrative of the operation of retardation tubes having helical and spiro-helical beam trajectories.
Figure 6:
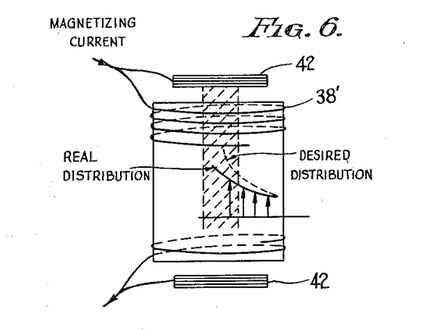
Fig. 6 is a diagram illustrating a detail of construction of the retardation device.

The spiral trajectory may readily be secured by providing in the cage a magnetic field H' which is homogeneous in direction, but which, unlike the field of the embodiment of Fig. 3, varies in intensity. The velocity V of the beam is maintained perpendicular to H' but its direction is inclined by a (small) angle $T\hat{M}_0V$ of say $p$ radians with respect to the tangent at the point of entry $M_0$ into the cage, to an imaginary circle of radius $r_0$ which would be described by the beam if admitted along the tangent into a uniform field. It can be shown that if the field H' varies inversely proportionally to the distance $r$ from the Oz axis, the trajectory in a transverse plane $xOy$ is the logarithmic spiral of equation $$r = r_0 e^{p\theta}$$

where the "pitch" $p$ of the spiral measures the trigonometrical tangent of the angle $T\hat{M}_0V$, that is to say, the angle itself whenever it is small as will always be the case in practice. A field of the type required is readily obtainable by means of a solenoidal winding such as the winding 38' (Fig. 6) which creates a decreasing field starting from the axis of the solenoid. It is sufficient to adjust the pitch of the turns of the winding 38' and, if necessary, to supplement the arrangement with two pan-cake coils 42, positioned over the ends of the solenoid, in order to obtain a distribution H(r) which is a very close approximation to the desired law, except along the axis itself. However, as will appear below, the region in the immediate neighborhood of the axis is not used in this embodiment.

In order to avoid complications at the collector end of the trajectory, care should be taken that the correct relationship between the velocity V and the field $H_0$ at the predetermined starting point $M_0$ of the spiral is maintained, in order that the spiral shall remain centered on the predetermined axis and start from said point $M_0$. This relationship is given by the expression $$V \cos p \approx V = r_0\Omega_0 = 22.2 \times 10^6 r_0 H_0$$

or, in terms of the tension U producing the velocity of the beam, and of the diameter $D_0 = 2r_0$, by the expression $$H_0 = \frac{5.36\sqrt{U}}{D_0}$$

With regard to the retardation produced by the spiral, it can be shown that if the initial velocity of the beam is fixed in magnitude V and inclination $p$, between two given distances $r_0$ and $r_N$, the total duration will be a function of the parameters V, $p$, $r_0$ and $r_N$, and will depend really only on $p$ and V and the distance $L = r_N - r_0$ between the terminal and initial points. It is given simply by $\gamma = L/pV$, which shows that everything occurs as if the electrons, as already indicated, describe the available segment, $L = r_0 r_N$, between the entrance and exit points, at the reduced velocity $pV$ instead of at their real velocity V. Conversely, it might be said that the electrons move at their full velocity V over an extended length $L/p$ instead of L. The $p$ is the factor of improvement of the arrangement.

The novel feature introduced in the operation of the device by the use of spiral trajectories between fixed end points, is that the magnetic field no longer affects the retardation as it does in the fractional revolution type of device hereinabove described.

Modulation may be accomplished by varying the inclination $p$ or the speed V of the beam. Modulation of the inclination $p$ will, of course, be obtained by causing deviation of the electron beam under the action of an electric or magnetic control field arranged in the manner well known in the art of cathode ray tubes, and subjected to a control magnitude.

If the modulation be based on variations in the speed V, no deviating organ is requisite, but, if the condition of centering is to be maintained, it will be necessary to modulate the magnetic field simultaneously. This can be done as indicated hereinabove, by applying the control magnitude to the grids of two tubes one of which supplies a current and the other a voltage, both these quantities being proportional to the control magnitude. In speed modulation, the constant inclination may be prepared in the sighting means, or, preferably, in the source itself by a suitable manufacturing arrangement of the parts thereof.

Similarly, the centering condition and the fixity of the end points may be maintained when the field $H_0$ is modulated, by providing for a compensation in the velocity V.

The value of the angle $p$ is bound up with the width of the collector, and it can be shown that if $\eta$ is the separation between the penultimate and ultimate convolutions of the spiral, the maximum width which the collector may have, if the beam is to be collected correctly, under the operating condition, including the centering condition hereinabove set forth, is equal to $\eta$. It is, however, possible to accentuate the variation of the magnetic field remote from the axis in order to increase the pitch of the spiral in the last few convolutions. Moreover, even if the collector is a little wider than $\eta$, the irregularity introduced thereby into the retardation is small.

If the condition of centering is abandoned, that is, if only the velocity or the field is modulated, the trajectory becomes a more complicated curve than the spiral, but by providing an extended collector, capable of capturing the end of the last convolution in all its positions it is still possible to collect an electron flux which has followed a path offering a definite retardation as a function of the velocity $V$ and the magnetic field $H(r)$. Within a rather narrow range, this function will, in general, be linear. The depth of modulation will be limited by the condition that the maximum variation of the collector end of the trajectory shall be less than the pitch between the last two convolutions of the curve, but it will be feasible, in this case also, to ease the situation by introducing an extra-rapid variation of the field in the neighborhood of the periphery of the cage, whereby to spread out the last few convolutions.

As explained up to now, the cage will be a simple cylinder and the director field a magnetic one, created by an exterior coil wound on the wall of the cylinder. However, an arrangement with an electric director field may also be used as illustrated diagrammatically in Fig. 7. In this embodiment the cage of the novel device may be constituted by a condenser formed of two coaxial cylindrical condenser plates 44, 46, between which a tension B establishes an electrical field $E$ which will be the director field. An electron released at $M_{oe}$ with a velocity $V$ slightly inclined by the angle $p$ to the tangent to the circle of radius $O_eM_{oe}$ in the plane of said circle, will follow a spiral path in the annular space of the condenser. The functions expressing the form of the path and the retardation are more complicated, but it will be obvious to those skilled in the art that this is of no importance for a device with constant fields. It can also be shown to be unimportant for a modulated device provided that the depth of modulation is sufficiently small for the effect to remain proportional to the cause, and this condition will always be complied with in ordinary practice. There is still a condition of centering between $r_{oe}$, $V$ and $E$, and it is possible, as in the embodiment already described, to modulate the inclination $p$ or the velocity $V$, that is, the tension $U$, and in the latter event, the field $E$ that is, the tension B, simultaneously. It is also feasible to modulate $V$ alone or $E$ alone by accepting a trajectory with variable exit extremity and providing a suitable collector.

An alternative embodiment of the novel device, derived from the case of a uniform magnetic field, is provided by deforming the primitive circular path axially to provide a helical trajectory instead of laterally to give a spiral path. The helical trajectory can be obtained by maintaining the homogeneity of the field transversely of the axis and inclining the incident velocity in a vertical plane by a small angle $q$ with respect to the plane of the primitive circle of radius $O_hM_{oh}$ (see Fig. 8). Owing to the fact that the magnetic field cannot modify the velocity of the electrons, the movement along the $Oz$ axis is performed at the constant velocity which obtained at the beginning and which is the component $qV$ along the vertical of the total velocity. Said component will, therefore, in the helical device, constitute the effective velocity. The collecting extremity S of the trajectory is fixed by the construction of the device at a distance $L_h=M_{oh}S$ from the point of entry, the distance being measured parallel to the axis of the helix, and the retardation is the time taken to cover said distance.

It can be shown that the same theory and the same dimensioning equations, and consequently the same orders of magnitude apply, as for the spiral device, and that the magnetic field again acts only as a means for allowing the effective velocity to be very small compared with the total velocity, the improvement factor being always $q$, which is equivalent to the $p$ of the embodiment previously described.

Figures 9, 10, 11, 12:
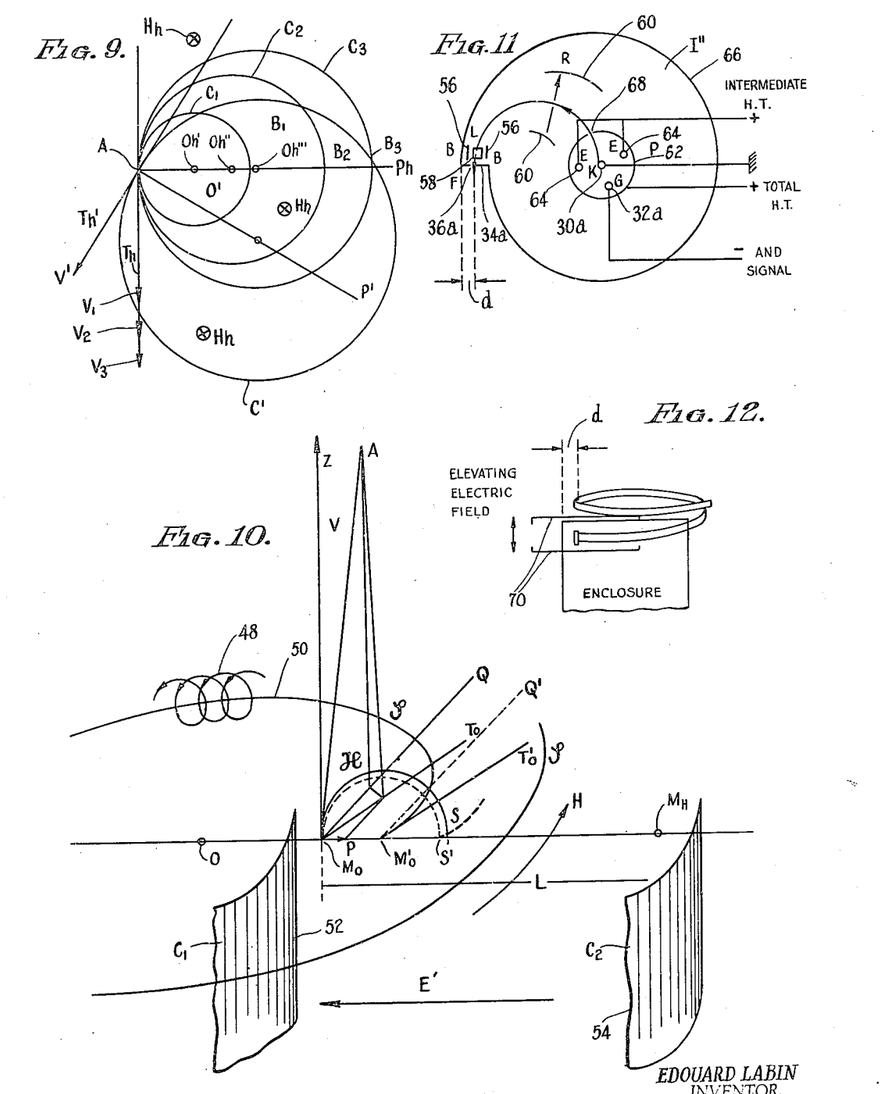
Figs. 11 and 12 are diagrams illustrating the generation of the electronic beam and the introduction thereof into the retardation space.

In one important particular, however, the helical embodiment differs from the spiral case, in which there is a privileged and imposed axis, around which the necessary distribution of the field $$H=H_o\frac{r_o}{r}$$

is established. With a helical path, there is no longer any such privileged axis, since, in all of the space where the field is uniform and homogeneous, the trajectory becomes equally well established and there is no longer any need to ensure a centering condition, that is, a relationship between the velocity $V$ and the field $H$. This feature is illustrated by Fig. 9 which is an end-on view of the helical paths which therefore, appear as circles. If from a given point A, electrons are discharged having velocities $V_1$, $V_2$, $V_3$, differing in value but all directed along the same perpendicular $AT_h$ to the field $H_h$, the trajectories of the electrons will be established along helices represented by the circles $C_1$, $C_2$, $C_3$, the centres $O_h'$, $O_h''$, $O_h'''$ of which will lie on the straight line $AP_h$ perpendicular to $AT_h$ at distances from A equal to $V_x/\Omega$, where $x=1, 2$ and 3 and $\Omega=aH_h$. It is therefore possible to vary $V$ alone to the exclusion of $H_h$ without destroying the helix, the only condition for ensuring the continuity of the working of the device being that of providing a suitably extensive collector, for example one covering the segment $B_1$, $B_2$, $B_3$, and located at a height $L_h$ from the real position of the point A. Hence the field $H_h$ need no longer be varied to compensate for variations of $V$, and it will be sufficient so to choose $H_h$ that for the greatest value of $V$, the diameter of the helix is still comprised within the bounds of the cage.

Furthermore, the arrangement will be operative, even if the initial velocity varies in direction as well as in magnitude, e. g. from $AT_h$ to $AT_h'$, as then the trajectory will merely become established along a helix represented by the circle $C'$. This fact may be utilized to avoid controlling even the direction of the initial velocity, but it may also be utilized advantageously to introduce a multiple exploitation of the device, as will be more fully explained below.

Since, in this embodiment, the trajectory is developed lengthwise of the axis of the helix, it follows that the height of the electron beam must be taken into account, at least in the neighborhood of the collector. With a given helix of constant pitch, it may be that the available height of beam is insufficient to enable the desirable intensity of current to be carried. This difficulty can be surmounted by spreading the last few convolutions of the helix axially, as by means of a weak vertical electrical field parallel to $H_h$ which is active only over the last few convolutions.

Instead of inclining the incident velocity V by the angle $q$ to the plane of the primitive circle, I may obtain the helical trajectory by providing a vertical electrical field parallel to the magnetic field and causing the electrons to approach the cage with a velocity perfectly perpendicular to the magnetic field $H_h$. Modulation of such a device would be effected by modulation of said vertical electrical field.

Another variant of the retardation device may be obtained by combining in one embodiment the principles of the helical and the spiral trajectories as illustrated in Fig. 10, in which the electron beam is caused to move in a helix 48 which is bent, as a whole, into a spiral 50 by utilizing a cylindrical condenser 52, 54 with a radial field E', in combination with a magnetic field H' directed in the sense of the parallel surfaces 52, 54. The practical result of this arrangement is a compound retardation one of the factors $p_1$ of which pertains to the helical trajectory while another factor $p_2$ pertains to the spiral, so that it is possible either to obtain the same effect as with the simple trajectories but with individual factors of much reduced order of magnitude, or to achieve a much greater effect if the same orders of magnitude are maintained for the individual factors as for the simpler paths.

In the simple spiral embodiment, it can be shown that the fundamental equations for the dimensioning thereof, allow of values to be adopted in practice which cause the technique of slow electrons to disappear, and this is obviously a considerable advantage. The lower limit of modulation obtainable is defined by the spontaneous dispersion of the velocity of the electrons forming an ordinary cathode beam. The effect of this dispersion is that the total flux suffers a retardation which is composed of a main part and a subsidiary part which presents itself naturally as a mean value representative of a large number of values taken statistically for all the lateral electron rays, and is therefore a parasitic variation. Only a very small portion of the dispersion at the origin is effectively disturbing and the undesired effect may be still further reduced by the interposition of speed filters. In fact the principle of speed filtering may be introduced into the preparation chamber or zone itself.

In Fig. 11 I have shown diagrammatically a convenient embodiment for the preparation chamber I" having an enclosing wall 66 which may be thought of as made of sheet material bent to provide a substantially cylindrical wall the ends of which terminate, however, in the plate 34a in which the slot 36a is formed. The cathode 30a lies along the general axis of the chamber I", and a sufficiently laminar concentration of the electrons may be obtained by providing a concentration plate 62 surrounding the cathode and connected to the total positive tension and having a slit at 68 through which the beam provided by the plate and the directing grid 32a and rodlets 64 may pass into the chamber proper, in which, if the wall 66 is of non-magnetic material, the general magnetic field H of the device will reign. This general field bends the trajectory of the beam, but not sufficiently to cause it to pass through the slot 36a, so that a pair of curved plates 60 is provided to give the necessary additional electrical field, or pan-cake coils may be located at the top and bottom of the chamber in order to accentuate the field along the axis. Alternatively, the field H may be excluded from the preparation chamber by constructing the walls of the latter of high permeability material to form a magnetic shield, provided that the main field be suitably corrected to compensate for the effect of the magnetic material of the shield. The beam may then be given the required curvature within the preparation chamber either by means of a more elaborate electrical field or by providing a special magnetic field within the chamber.

Since the grid 32a is designed to choke out the beam in the direction away from the slit 68, it controls the total electronic flux which passes and would therefore be used to modulate the beam in intensity by the oscillation it is desired to retard.

If such a chamber is used for preparing the beam of a device of the spiral trajectory type, the minimum separation between convolutions with which the spiral may be begun is defined by the distance $d$ between the slot 36a and the outer edge of the chamber wall 66. Such an arrangement may be utilizable in many applications without difficulty, but it is also possible to adapt the chamber of Fig. 11 so as to eliminate all restrictions as the initial lateral spread of the convolutions, by making use of the principles of the helical trajectory in the neighborhood of the slot 36a. Thus, as illustrated in Fig. 12, a vertical electrical field indicated by the plates 70 may be provided only in the region where the beam leaves the chamber, whereby the trajectory is caused to rise. Obviously the electrical field may be so regulated that the beam is raised above the chamber in a single turn of the helix, whereupon the spiral may be allowed to develop without further elevation of the beam and with an initial pitch as small as we please. For purely helical trajectories, such an elevation may be utilized as the first step in the formation of the helical path.

Although the chamber I" has been described as having the cathode 30a, located along the axis of the device as a whole, that is, as being centrally disposed within the cage, it is also possible to position the preparation chamber excentrically within the cage, in which event, the cathode and slot may be so oriented that curvature of the beam within the preparation chamber is unnecessary. In these circumstances, the construction of the preparation chamber may be simplified by the omission of the surrounding wall 66 of Fig. 11, as this merges into the plate 62. In this modification, the same distance $d$ at the point of issuance of the beam will still determine the allowable minimum spread of the first few convolutions of a spiral path.

Figure 13:
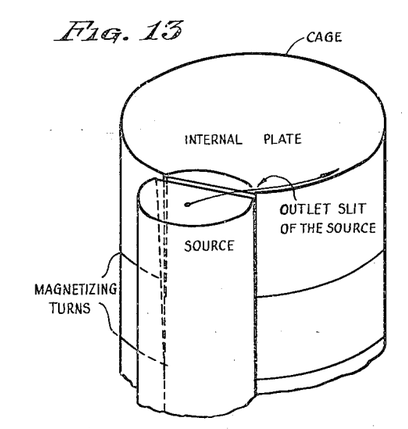
Fig. 13 is a diagrammatic perspective view of a portion of one form of retardation tube.

It is, however, possible to proceed along the lines of an eccentric positioning of the preparation chamber to the extent of locating the chamber outside the cage as illustrated in Fig. 13. This structure while being more complicated for the glass-blower, is simpler from the electronic point of view as the source can more readily be isolated from the cage.

For embodiments involving the use of multiple beams, a star type source comprising a wall having a plurality of slots in its periphery and a single cathode of the kind capable of irradiating in several directions may be used when the velocities of the different beams are equal. For parallel beams of differing velocity, a plurality of cathodes may be provided or a single cathode may be employed in combination with radially stepped slots superimposed on each other and spaced lengthwise of the cathode.

The sighting means may be embodied either as a pair of plates 56 parallel with the beam which passes therebetween, when the inclination to be created is transversely of the beam or by a pair of plates 58, at right angles to the beam, only one such plate being shown in Fig. 11, when the beam is to be inclined heightwise. For devices in which the trajectory is of a compound nature, both sets of plates would be used.

Figure 14:
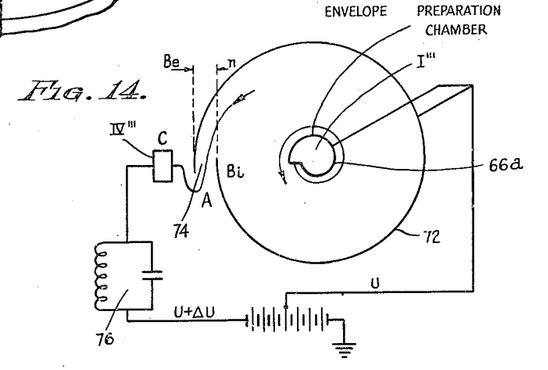
Figs. 14 and 15 are diagrams illustrating the collection of the retarded beam at the output end of my novel device.
Figure 15:
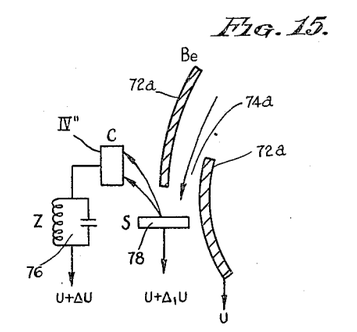

Throughout the foregoing description and discussions it has been tacitly assumed that, within the cage, the electrons were subjected only to the director field explicitly mentioned. In particular it was assumed that they would not suffer any acceleration in the sense of their linear velocities, except when this acceleration was the useful effect especially adjusted. If, however, a collector connected to the external utilization impedance is plunged directly into the cage, an alternating current will be developed thereon by the passage of the current through the impedance. This potential is the useful magnitude, but the more important it becomes, the more variable field it produces between the collector and other regions of the field within the cage becomes troublesome. Owing to the precision with which the director fields must be adjusted, such interference must be completely eliminated by uncoupling the point of exit from the cage with respect to the point of exit from the device as a whole. This uncoupling may readily be achieved in a variety of ways, two of the simplest of which are illustrated in Figs. 14 and 15, in terms of a device of the spiral trajectory type. In the construction of Fig. 14, the whole cage III''' is surrounded by an enclosure 72 held at the same potential U as the wall 66a (or the plate as the case may be) of the source I'''. The enclosure 72 is provided with an outlet opening 74, preferably formed by overlapping of the edge portions of the sheet material constituting the enclosure 72. This opening need not be more than a few tenths of a millimeter wide. Under these conditions, the trajectory develops in a completely equi-potential space except in the near neighborhood of the opening 74. The collector IV''' is located outside the enclosure to the side of the opening 74 as shown and is held at a potential $U+\Delta U$, where the excess $\Delta U$ is sufficient for the tension to be still a few volts above U at the minimum values of the useful tension developed by the output impedance 76. This is sufficient to cause the tendency to continue the spiral motion outside the envelope to be overcome by the attraction of the collector IV'''. By suitably adjusting this attraction the outer of the overlapping edges defining the opening 74 may be positioned so as to occult almost entirely the collector. With such a construction the penetration into the cage of the disturbing field created by the excess of the variable potential between the enclosure 72 and the collector may be made sufficiently small so that the width of the perturbing region shall satisfy the condition that as to the separation $\eta$ between the ultimate and penultimate convolutions of a spiral trajectory.

Fig. 15 shows a refinement of the above-described construction, according to which a secondary emission element 78 is located to receive the beam as it issues from the opening 74a of the enclosure 72a and to direct the secondary emission to the collector proper IV$^{iv}$ in a manner which will be clear to those skilled in the art. Evidently more than one stage of secondary emission may be used in cascade. This modification has the advantage that at the first step of secondary emission the member 78 may be brought to a fixed potential differing little from U and even identical with U. The penetration of the variable electric field of the collection region into the cage, is then reduced to an infinitesimal value.

The same principle of secondary emission uncoupling may be applied for devices having helical or compound trajectories with fixed or variable end point, as will be apparent without further detailed explanation, to those skilled in the art.

The uncoupling of the collector converts the tube into a source of constant current. In the ordinary language of electronic tubes this is equivalent to saying that the internal resistance of the tube is infinite. Moreover there is a very high degree of uncoupling between the output terminal on the one hand, and the cathode and grid on the other, so that the capacity commonly designated $C_{ga}$ is totally negligible, and the output capacity $C_{ak}$ is merely that of the small output plate in relation to the closest point raised to the potential of the mass. Hence $C_{ak}$ is very small, of the order of 1 $\mu\mu$f. and less. Hence it would be possible to work with utilization impedances as big as the art of circuits will enable to be made. Furthermore, it can be shown that, in contradistinction to the low values obtained with cathode oscillographs for television and the like devices, it is possible in my novel device, with an impedance of $10^5$ ohms and a 20% modulation of the cathode current, to obtain a useful output tension of the order of 10 volts with an amplification of about 30. Hence, in addition to its utility as a retarding means, my novel device can be used very advantageously as a stage of amplification and separation in a chain of circuits.

The practical advantage and importance of my novel device when used in its simplest form without modulation, will be readily appreciated when it is understood that by its aid the problems of retardation in very numerous branches of telecommunication, and particularly in telephony, may be solved without difficulty, whereas retarding cells to give some milliseconds as at present in use in some telephone installations are of so cumbersome a nature as to occupy a whole room and weigh in the neighborhood of a ton. With my device it is possible, for fixed installations, to inscribe retardations of from 1 to 10 milliseconds within ranges of the order of 15 to 50 cms.

The retardation introduced by my novel device is a true retardation and not a phase displacement derived with respect to a frequency. It is rigorously constant and independent of the signal passing, and so long as limitations are not imposed by the input and output circuits connected to the device, it allows signals of any form to be delayed with precision.

Figure 16:
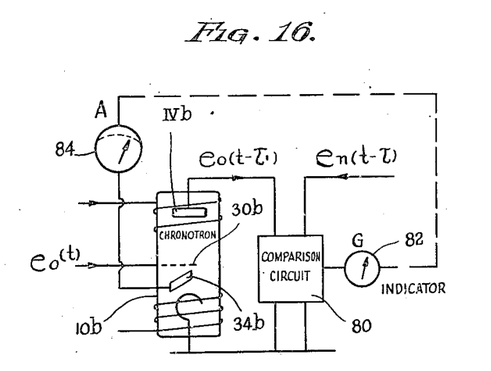
Figs. 16, 17 and 18 are diagrams illustrating various applications of the novel retardation tube.

Obviously, since the device produces retardation, it may be utilized to measure retardation, as by including it in a circuit of the kind illustrated in Fig. 16, in which a retarding device 10b according to the present invention is shown diagrammatically with its grid 30b connected to receive an unretarded signal $e_o(t)$. The collector IV$_b$ is connected to a suitable comparison circuit, as for example an opposition bridge, indicated by the rectangle 80, to impress on one portion of the comparison circuit the result, $e_0(t-\tau_1)$, of passing the signal $e_0(t)$ through the retarding device 10$b$ while impressing on a retardation control member, for instance the plate 34$b$ thereof, a magnitude controllable by an adjustment device 84, to vary the retardation produced. The signal $e_n(t-\tau)$ the retardation of which is to be measured, is impressed on another portion of the comparison device, and an indicator 82 responsive in some convenient manner is included in the circuit to indicate when balance is obtained between the unknown wave and the signal retarded by the retardation device. The adjustment device 84 may of course be calibrated directly in retardations or in some other magnitude proportional thereto.

Owing to the facility with which the control magnitude governing the retardation impressed on the signal compared with the unknown wave, can be manipulated, such a retardation measuring device may be made automatic, by causing the control magnitude to be dependent on the unbalance of the indicator 82, and providing the indicator with means for restoring it to its position of equilibrium when balance has been obtained.

Such retardation measuring assemblies may for instance be used with advantage as distance measuring devices in systems for detecting obstacles.

The foregoing remarks respecting the measurement of retardation are equally applicable to the creation and measurement of phase displacements. It is sufficient to consider the case in which the notion of phase is defined, that is, the case of sinusoidal signals of frequency $\omega$, and to note that in such case, a retardation $\tau$ means a phase displacement of $\theta=\omega\tau$.

Figure 17:
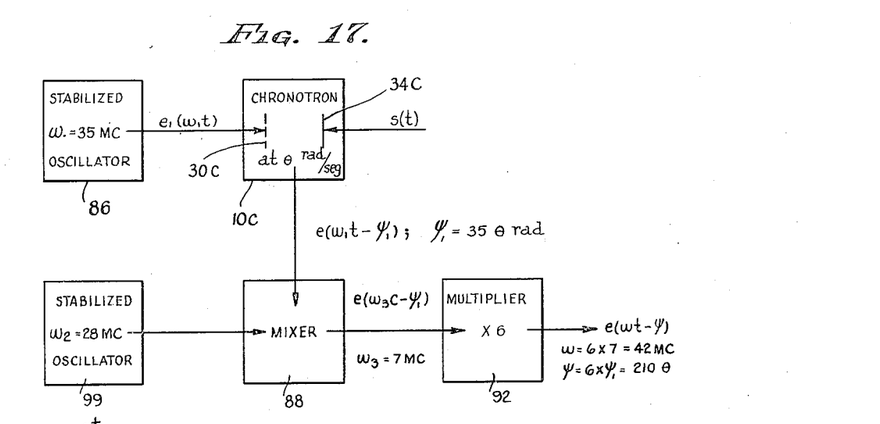

My novel device may be utilized immediately for phase or frequency modulation, by making the control signal, $S(t)$, the integrated intelligence to be transmitted, and taking for $e(t)$ the oscillations of a central frequency obtained from a stabilized pilot. The novel device of the present invention allows the equivalent phase created to acquire in a single step the full value desired in practice, up to several thousands, thus avoiding the numerous and troublesome frequency multiplications required by ordinary modulating processes which act on the piloted wave. For example, as shown in Fig. 17, it can be arranged to modulate with a low retardation by impressing on the grid 30$c$ of the device 10$c$, a signal having a frequency $\omega$ intentionally higher than the value, say 7 mc., desired in the first stage of the transmitter chain. For instance, $\omega$ may be chosen at about 35 mc. If the output of the device 10$c$ is heterodyned in a mixer 80 with another stabilized wave coming from a pilot 99, reversion to 7 mc. is achieved but with all the phase displacement generated by the retarding device 10$c$ upon the higher frequency. To step from 7 mc. to the band used in frequency modulation, the multiplier 92 need not multiply by more than 6 or 7 as compared with the usual hundreds.

Figure 18:
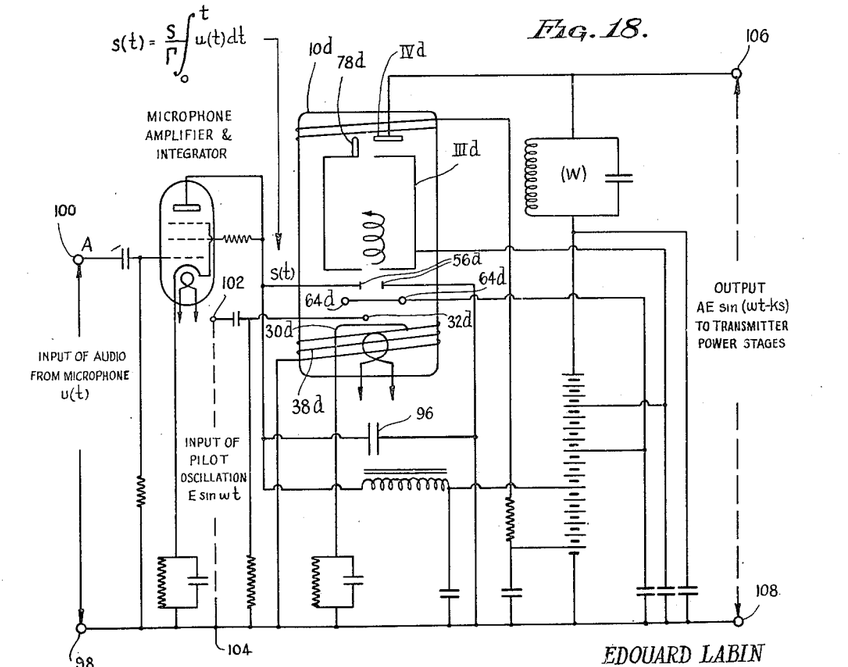

Another highly useful application of my novel retarding device is in the constitution of a universal frequency modulation unit as illustrated in Fig. 18. The unit shown comprises a retarding device 10$d$ having a cathode 30$d$, a beam-intensity control electrode 32$d$ and an accelerating and focusing electrode 64$d$ constituting the source chamber for preparing the intensity modulated beam, deflecting electrodes 56$d$ constituting the sighting means for preparing the incident velocity of the beam, a coil 38$d$ for producing an electron director field constituting the retardation chamber for the electron beam and electrodes 78$d$ and IV$d$ constituting the collector system of the tube. The intensity modulated beam produced in the source chamber is directed between deflecting electrodes 56$d$ serving as an effective point of origin for the beam with respect to its subsequent travel through the electron-director field. The deflection of the beam by the electrodes 56$d$ causes the beam to assume a direction component perpendicular to the axis of the director field by means of which the beam is given a curvilinear trajectory in the form of a helix throughout the retardation chamber defined by the said effective point of origin and the collector system. By varying the potential applied to electrodes 56$d$ and hence by controlling the direction of the beam relative to the direction of the director field, the number of turns of the helical trajectory and hence the time of transit of the electron beam between the fixed point and the collector electrode and the amount of retardation of the voltage applied to the intensity control electrode are correspondingly varied as explained above in connection with Fig. 8.

At the end of its helical trajectory, the beam impinges on the secondary-emissive anode 78$d$ from which the secondary electrons produced are directed to the adjacently positioned output electrode IV$d$. By means of this arrangement the variable electric field existing at the region of the output electrode is substantially completely prevented from penetrating into the retarding chamber as pointed out above in connection with Fig. 15.

It will be noted that, like the ideal hexapole previously mentioned, the arrangement shown in Fig. 18 has two pairs of input terminals 98—100 and 102—104 and one pair of output terminals 106—108. The input terminals 98—100 to which is applied the intelligence voltage $u(t)$ derived from a microphone or similar audio voltage generator, include a microphone amplifier tube the output voltage of which is integrated by a condenser 96 which shunts the anode circuit of the tube and applied to the deflecting electrodes 56$d$. The pilot stabilized high frequency potential $E \sin wt$, which is to be frequency modulated, is applied to the input terminals 102—104 and thus coupled to the intensity control electrode 32$d$ and modulates the intensity of the electron beam proportional to the amplitude variations of the pilot potential. The frequency modulated potential produced at the output electrode IV$d$ of the tube across the load impedance W appears at the output terminals 106—108 which may be coupled to one or more frequency multiplying and power amplifying stages in accordance with well-known practice.

Although the present invention has been described with more particular reference to certain preferred embodiments, I do not intend to be limited thereby and I may introduce various modifications in the construction and details of my novel device without thereby departing from the spirit and scope of the invention as defined in the accompanying claims.

I claim:

1. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate an electron-director field extending over substantially the entire space between said fixed point and said collector means to impress a curvilinear path on the electron beam between said fixed point and said collector means substantially longer than the distance between said fixed point and the collector means, and means to vary the direction of said beam at said fixed point relative to the direction of the electron-director field and proportional to the amplitude variations of said voltage to proportionally vary the length of said curvilinear path and to thereby produce variations in the time of travel of the beam between said fixed point and said collector means proportional to the amplitude variations of said voltage.

2. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate an electron-director field extending over substantially the entire distance between the said fixed point and the said collector means to impress on the electron beam a curvilinear path having a plurality of turns, and means to vary the direction of said beam at said fixed point relative to the direction of the electron-director field and proportional to the amplitude variations of said voltage to proportionally vary the number of turns in said path to thereby produce variations in the time of travel of the beam between said fixed point and said collector means proportional to the amplitude variations of said voltage.

3. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate an electron-director field extending over substantially the entire space between said fixed point and said collector means to impress a curvilinear path on the electron beam between said fixed point and said collector means substantially longer than the distance between said fixed point and the collector means, and electrostatic deflecting members at said fixed point to vary the direction of said beam relative to the direction of the electron-director field and proportional to the amplitude variations of said voltage to proportionally vary the length of said curvilinear path and to thereby produce variations in the time of travel of the beam between said fixed point and said collector means proportional to the amplitude variations of said voltage.

4. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate a magnetic electron-director field extending over substantially the entire space between said fixed point and said collector means to impress a curvilinear path on the electron beam between said fixed point and said collector means substantially longer than the distance between said fixed point and the collector means, and means to vary the direction of said beam at said fixed point relative to the direction of the electron-director field and proportional to the amplitude variations of said voltage to proportionally vary the length of said curvilinear path and to thereby produce variations in the time of travel of the beam between said fixed point and said collector means proportional to the amplitude variations of said voltage.

5. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate an electron-director field extending over substantially the entire space between said fixed point and said collector means to impress a curvilinear path on the electron beam between said fixed point and said collector means substantially longer than the distance between said fixed point and the collector means, and means to vary the direction of said beam at said fixed point relative to the direction of the electron-director field and proportional to the amplitude variations of said voltage to proportionally vary the length of said curvilinear path and to thereby produce variations in the time of travel of the beam between said fixed point and said collector means proportional to the amplitude variations of said voltage, said collector means comprising an anode electrode having a secondary emissive surface arranged to intercept said beam and a collector electrode positioned in the vicinity of the anode electrode and arranged outside the region of said curvilinear path.

6. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate an electron-director field extending over substantially the entire space between said fixed point and said collector means to impress a helical path on the electron beam between said fixed point and said collector means substantially longer than the distance between said fixed point and the collector means, and means to vary the direction of said beam at the said fixed point relative to the direction of the electron-director field and proportional to the amplitude variations of said voltage to proportionally vary the number of turns in said helical path and to thereby produce variations in the time of travel of the beam between said fixed point and said collector means proportional to the amplitude variations of said voltage.

7. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate an electron-director field extending over substantially the entire space between said fixed point and said collector means to impress a helical path on the electron beam between said fixed point and said collector means substantially longer than the distance between said fixed point and the collector means, and electrostatic deflecting members at said fixed point to vary the direction of said beam relative to the direction of the electron-director field and proportional to the amplitude variations of said voltage to proportionally vary the number of turns in said helical path and to thereby produce variations in the time of travel of the beam between said fixed point and said collector means proportional to the amplitude variations of said voltage.

8. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate a magnetic electron-director field extending over substantially the entire space between said fixed point and said collector means and having lines of force substantially coextensive with the direction of propagation of the electron beam from said fixed point to impress a helical path on the electron beam between said fixed point and said collector means substantially longer than the distance between said fixed point and to collector means, and means to vary the direction of said beam at said fixed point relative to the direction of the electron-director field and proportional to the amplitude variations of said voltage to proportionally vary the number of turns in said helical path and to thereby produce variations in the time of travel of the beam between said fixed point and said collector means proportional to the amplitude variations of said voltage.

9. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate an electron-director field extending over substantially the entire space between said fixed point and said collector means to impress a helical path on the electron beam between said fixed point and said collector means substantially longer than the distance between said fixed point and the collector means, and means to vary the direction of said beam at the said fixed point relative to the direction of the electron-director field and proportional to the amplitude variations of said voltage to proportionally vary the number of turns in said helical path and to thereby produce variations in the time of travel of the beam between said fixed point and said collector means proportional to the amplitude variations of said valtage, said collector means comprising an anode electrode having a secondary emissive surface arranged to intercept said beam and a collector electrode positioned in the vicinity of the anode electrode and arranged outside the region of said helical path.

10. An electronic device for producing a retardation of a varying electrical potential proportional to the amplitude variations of a voltage applied thereto, comprising a discharge tube having an evacuated envelope, means to generate an electron beam and to direct the same towards a fixed point, means to modulate the intensity of the electron beam proportional to the amplitude of the varying potential, means to passively collect the modulated beam at a point spaced from said fixed point, means to generate a magnetic electron-director field extending over substantially the entire space between said fixed point and said collector means and having lines of force substantially coextensive with the direction of propagation of the electron beam from said fixed point to impress a helical path on the electron beam between said fixed point and said collector means substantially longer than the distance between said fixed point and the collector means, and means to vary the direction of said beam at said fixed point relative to the direction of the electron-director field and proportional to the amplitude variations of said voltage to proportionally vary the number of turns in said helical path and to thereby produce variations in the time of travel of the beam between said fixed point and said collector means proportional to the amplitude variations of said voltage, said collector means comprising an anode electrode having a secondary emissive surface arranged to intercept said beam and a collector electrode positioned in the vicinity of the anode electrode and arranged outside the region of said helical path.

11. A method of imparting to a time-variable electrical potential a retardation proportional to amplitude variations of a voltage, comprising the steps of generating a beam of electrons, projecting the electron beam in a given direction towards a first fixed point, modulating the intensity of the electron beam proportional to the amplitude of said potential, generating an electron-director field extending over substantially the entire space between said fixed point and a second fixed point spaced from said first fixed point, directing the intensity modulated beam into said director field towards said second fixed point and impressing on the electron beam a curvilinear trajectory at substantially all points of travel of the beam between said fixed points to produce an effective beam path substantially longer than the distance between said fixed points, varying the direction of incidence of the electron beam into said director field relative to the direction of the director field and proportional to amplitude variations of said voltage to vary the length of said curvilinear path and the time of travel of the beam between said fixed points proportional to the amplitude variations of said voltage, and collecting the so treated electron beam in the region of said second fixed point.

12. A method of imparting to a time-variable electrical potential a retardation proportional to amplitude variations of a voltage by means of a discharge tube having means to generate an electron beam and to direct the same towards a fixed point and collecting means for the electron beam spaced from said fixed point, comprising the steps of generating a beam of electrons, modulating the electron beam before the beam reaches said fixed point to produce intensity variations of the beam proportional to the amplitude of said potential, generating a magnetic electron-director field extending over substantially the entire space between said fixed point and a second fixed point spaced from said first fixed point and having lines of force substantially coextensive with the direction of propagation of the electron beam from said first fixed point, directing the intensity modulated beam into said director field towards said second fixed point and impressing on the beam a helical trajectory at substantially all points of travel of the beam between said fixed points to produce an effective beam path substantially longer than the distance between said fixed points, varying the direction of the beam at said first fixed point relative to the direction of the director field and proportional to amplitude variations of said voltage to vary the number of turns in said helical path and the time of travel of the beam between said fixed points proportional to amplitude variations of said voltage, and collecting the so treated electron beam in the region of said second fixed point.

EDOUARD LABIN.